March 28, 1939.　　　　L. ARNOLD　　　　2,151,727

CONTAINER FOR LIQUIDS

Filed July 11, 1938

Witness:

Inventor,
Lloyd Arnold,
Barton Baker Atty.

Patented Mar. 28, 1939

2,151,727

UNITED STATES PATENT OFFICE 2,151,727

CONTAINER FOR LIQUIDS

Lloyd Arnold, Chicago, Ill., assignor to Board of Trustees of the University of Illinois, Urbana, Ill.

Application July 11, 1938, Serial No. 218,593

2 Claims. (Cl. 215—31)

One of the objects of my invention is to provide a container suitable for liquids, particularly milk, of such construction that the dripping of fluid from the container incident to, and resulting from, the pouring of the contents, and the flow thereof along, and about, the outer surface of the container will be largely prevented, thus affording increased safety and convenience in the handling, dispensing and use of liquids and greatly reducing the danger of contamination.

Another object of my invention is to provide a container of such form that it can be capped, or closed, quickly, effectively and economically.

I have found that the spilling or dripping of milk incident to pouring from a bottle varies according to the fullness of the bottle and the active area of the pouring lip or portion of the surface of the bottle about its mouth with which the liquid being poured is in contact. The most hazardous pour from a full bottle is the first, the active area of the pouring lip and the dripping tendency being greatest then. As the contents are emptied, the active area of the pouring lip diminishes and so does the dripping tendency. The dripping tendency incident to the initial pour from a given bottle, therefore, determines the form of the preventive means. The provision of a single peripheral shoulder about the mouth of the bottle breaks or interrupts the continuity of the film of milk in contact with the outer surface of the pouring lip during pouring but does not prevent dripping as pouring ceases, and several drops of milk will usually flow down the outer surface of the bottle when the bottle is restored to normal vertical position. I have found, however, that the provision of one or more additional peripheral shoulders of suitable dimensions and somewhat smaller diameter immediately adjacent and below the first, so as to form a plurality of inverted steps or recesses in downward progression, will substantially prevent the spilling of milk on the outer surface of the bottle incident to normal pouring.

Figure 1:
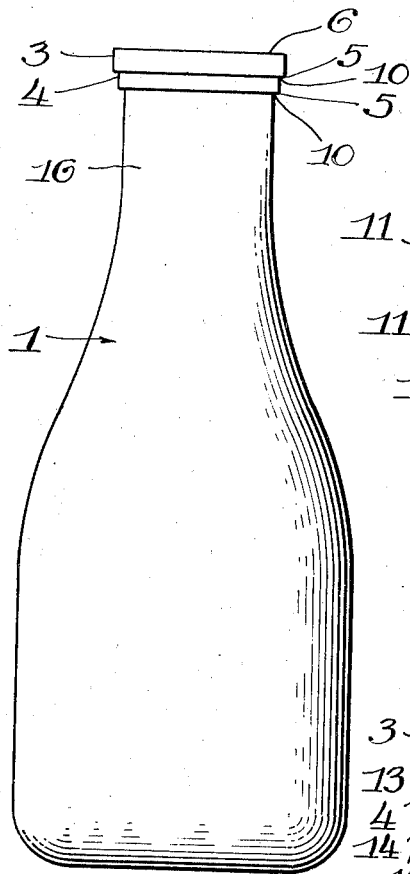
Figure 1 is a side elevation of a milk bottle embodying one form of the invention.
Figure 3:
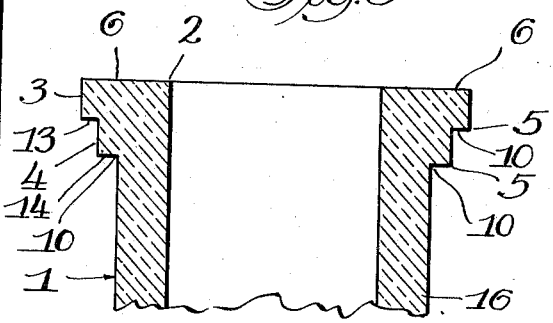
Figure 3 is a fragmentary central, vertical section of Figure 1 on an enlarged scale.

Referring to Figures 1 and 3, the upper end or neck 16 of the bottle 1 is so formed as to provide on the outer surface of the pouring lip 2—6—3—13—4—14 two annular shoulders vertically adjacent to each other as indicated at 3 and 4, respectively, the upper shoulder being greater in diameter than the lower, and each receding sharply as shown at 5. These shoulders and the recesses formed by them are of such form and proportions as to break or interrupt the drip, and flow, of liquid incident to the pouring of the contents of the bottle, so as largely to prevent spilled liquid from coming into contact with the outer surface of the bottle below the second shoulder.

Figure 2:
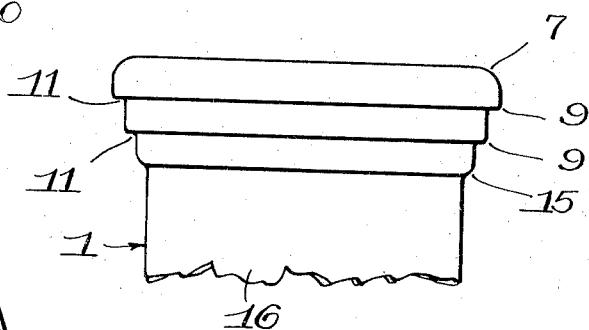
Figure 2 is a side elevation of the upper part of another form of milk bottle embodying a modified application of the invention.
Figure 4:
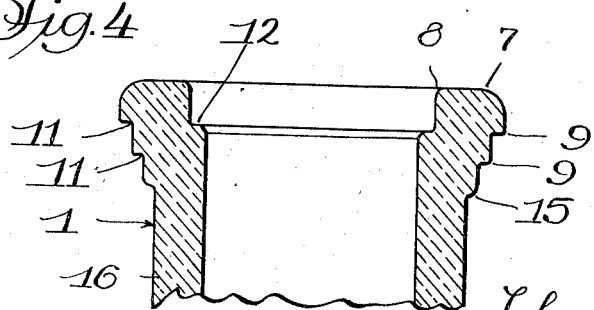
Figure 4 is a central, vertical section of Figure 2.

The top of the bottle may be flat as shown as 6 in Figures 1 and 3 or rounded as shown at 7 and 8 in Figures 2 and 4, or of other suitable form. The pouring lip may be rectilinear as shown at 2, 6, 3, 13, 4 and 14 in Figure 3, or of other suitable form. The shoulders are preferably continuous and annular in form but their periphery may be of other suitable shape. Their lower edges are preferably substantially rectangular as shown at 5 in Figures 1 and 3 but may be slightly curved as shown at 9 in Figures 2 and 4 or other suitable form. The inner corners of the recesses may likewise be substantially rectangular as shown at 10 in Figures 1 and 3 or slightly curved as shown at 11 in Figures 2 and 4, or of other suitable form.

In the case of milk bottles, I have found that an upper shoulder $\frac{3}{32}$ inch high by $\frac{1}{16}$ inch deep and a lower shoulder $\frac{3}{32}$ inch high by $\frac{1}{16}$ inch deep give satisfactory results. These dimensions may be varied according to the cohesiveness of the contents but extended experiments with milk have demonstrated that the recesses provided by the shoulders ought not to be less than $\frac{1}{16}$ of an inch in depth. Shoulders of the dimensions indicated afford a suitable grip for external capping and being shallow, permit substantial economy in capping material.

In Figure 2, in which an inner cap seat is provided as shown at 12 in Figure 4, a third shoulder 15 is provided, which also serves to reenforce the upper portion of the bottle and as a grip-guard.

Having thus disclosed the invention, I claim:

1. A liquid container having a pouring lip with an outer surface provided with a plurality of successively adjacent peripheral shoulders arranged in vertical series, each shoulder being of greater diameter than the next lower one, said shoulders being so proportioned and disposed as substantially to prevent dripping of the contents on the outer surface of the container as an incident of normal pouring thereof, the uppermost shoulder being approximately 5/32 of an inch high by 1/16 of an inch deep, the other shoulders being approximately 3/32 of an inch by 1/16 of an inch deep.

2. A milk bottle having two vertically adjacent angular shoulders about the outer surface of its mouth, one above the other, the upper shoulder being of larger diameter than the lower one and merging with the mouth of the bottle, said shoulders having substantially rectangular lower edges and being so proportioned and disposed as to form substantially rectangular horizontal recesses breaking the flow of the contents along the outer surface of the bottle incident to pouring thereof, and substantially preventing the spilling of the contents upon the body of the bottle, said recesses being at least one-sixteenth of an inch deep horizontally, and the heighth of the said upper and lower shoulders being of the order of at least five thirty-seconds of an inch and three thirty-seconds of an inch, respectively.

LLOYD ARNOLD.